UNITED STATES PATENT OFFICE.

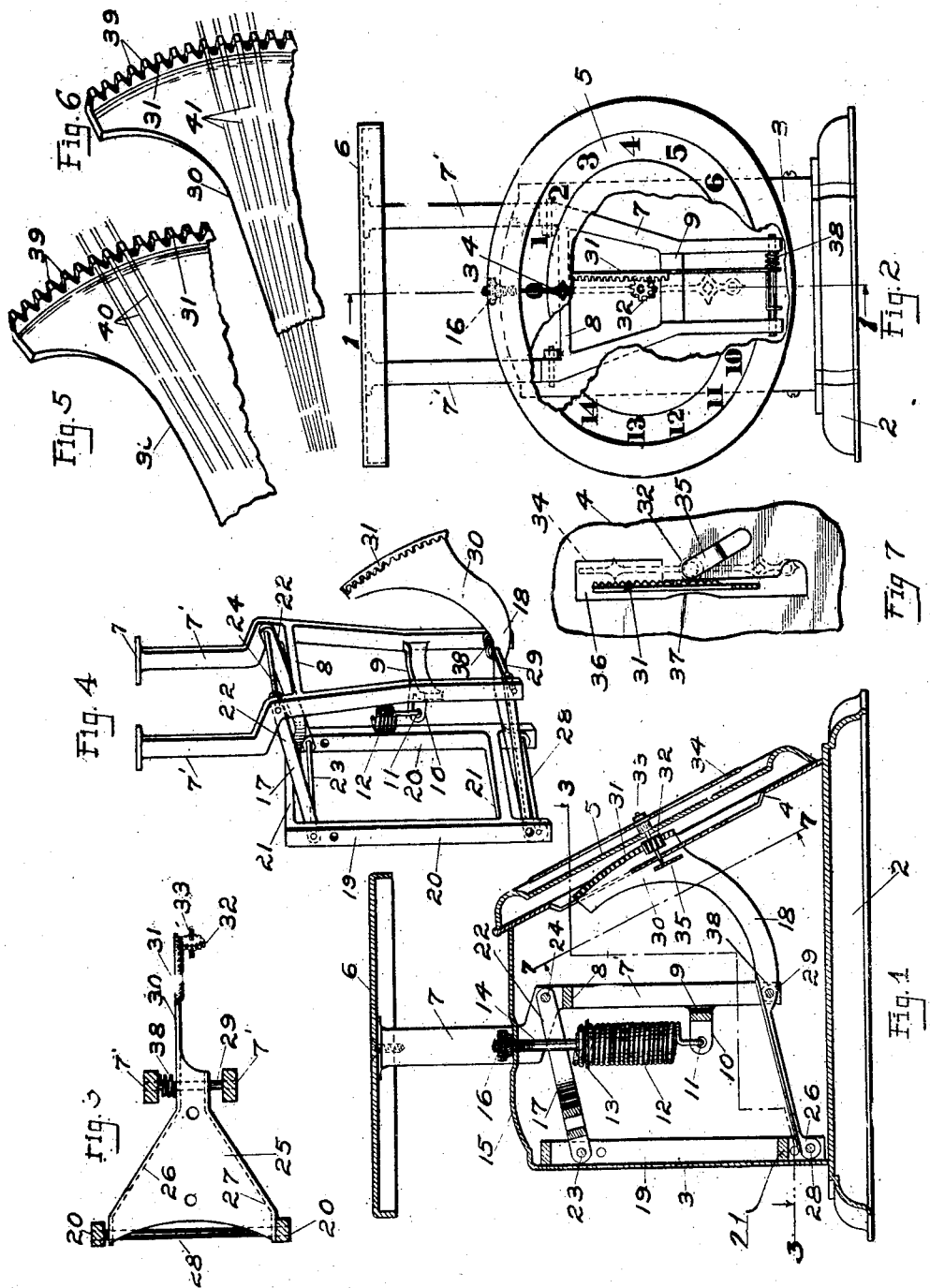

WILLIAM N. PELOUZE, OF CHICAGO, ILLINOIS.

WEIGHING-SCALE.

1,019,698.

Specification of Letters Patent.

Patented Mar. 5, 1912.

Application filed February 12, 1910. Serial No. 543,638.

*To all whom it may concern:*

Be it known that I, WILLIAM N. PELOUZE, a citizen of the United States, and resident of the city of Chicago, county of Cook, and State of Illinois, have invented certain new and useful Improvements in Weighing-Scales, of which the following is a full, true, clear, and exact description.

My invention relates to weighing-scales and has particular reference to light, portable or household scales.

The object of my invention is to provide a light, portable, durable scale of pleasing appearance and so constructed that the scale indications may be easily and accurately read.

The chief object of my invention is to produce a scale mechanism for a scale, having an inclined scale-plate, which can be cheaply manufactured and which will be accurate in its operation.

A further object is to provide a cheap, efficient, accurate and durable means for transmitting motion from the scale-lever to the index-hand of the inclined scale-plate.

Another object of my invention is to improve and simplify the construction and operation of the rack and gear connection between the scale-lever and the index-hand, to the end that the cost of manufacture shall be reduced and with a view to obviating the necessity for the location of the inclined scale-plate at any one definite angle to the base.

My invention consists broadly in a weighing-scale having a scale plate, an index-hand adapted to sweep said plate and a pinion adapted to move said hand, in combination with a pivotally mounted scale-lever and a rack integral with said lever for engagement with said pinion to move said hand.

My invention consists further in a novel scale-arm or lever for a weighing-scale, of the class above mentioned, having an integrally formed rack for engagement with the pinion which moves the index-hand, the teeth of the rack being so formed that the alinement of each tooth of the rack as it engages the pinion is perfect within reasonable limits.

The invention will be more readily understood by reference to the accompanying drawings, forming a part of this specification, and in which—

Figure 1 is a central vertical section of a weighing scale embodying my invention, same being shown on the section line 1—1 of Fig. 2. Fig. 2 is a front elevation of the scale, having the central portion of the scale-plate broken away to show the scale mechanism behind same; Fig. 3 is a detail horizontal sectional view of the scale mechanism upon the irregular section line 3—3 of Fig. 1, the scale-lever and the pinion and its shaft being shown in top plan view; Fig. 4 is a perspective view of the load or scale-post, its pivot members and the frame to which they are pivotally attached; Fig. 5 is an enlarged fragmentary diagrammatic perspective view of the curved rack or segmental gear upon the free end of the scale-lever showing the teeth of same partly formed; Fig. 6 is a view similar to Fig. 5 showing the curved rack in its completed or finished condition. Fig. 7 is a detail sectional view on the section line 7—7 of Fig. 1.

As shown in the drawings, 2 represents the base of the scale, 3 is the casing securely mounted upon the base, 2, and carrying the scale-mechanism. The front wall, 4, of said casing, 3, is inclined at an angle preferably of about 60 degrees to the base and carries a circular scale-plate, 5, securely mounted in front of and parallel to same. The inclination of the scale-plate, 5, makes the accurate reading of it convenient when the scale is set below the eye of the user.

The scale-pan, 6, is above the scale-case and is supported upon the U-shaped load-post, 7, comprising the two sides or legs, 7', 7', that are joined by the integral cross-bars 8 and 9. Said cross-bar, 9, is provided with a central rearwardly extending projection, 10, having an opening, 11, in its free end, to receive the lower end of the scale-spring, 12. The upper end of the spring is fixed upon the collar or washer, 13, upon the lower end of the spring adjusting screw, 14. Said screw passes through an opening in the cover, 15, of said scale-case, 3, and is held by the spring-adjusting nut, 16. The side bars or legs 7', 7', of the load post, 7, are offset rearwardly immediately below where they pass upwardly through the cover, 15, of the scale-case, sufficient to bring them into a vertical plane with the spring, 12. The scale pan, 6, is thus supported centrally over the balance-spring, 12.

The load-post plays through suitable openings in the top of the scale-case and is held in proper alinement by the link or pivot member, 17, and the scale-lever, 18, which is parallel to said link, 17, and both of which are pivoted on said load-post, 7, and on a scale-frame, 19. Said frame, 19, comprises the vertical side-bars, 20, joined together by the integral horizontal bars, 21, and is mounted in vertical position adjacent the rear wall of said case 3. The pivot member, 17, comprises a frame having forwardly projecting free side-arms, 22—22, and is connected at its rear end to said scale-frame, 19, adjacent its upper end by the pivot rod, 23, and at its forward end to said load-post by the pivot rod, 24, which passes through the free ends of said side arms, 22, and the side posts 7', 7', of said load-post. Free space is thus left for the relative movement of said pivot-member, 17, and said balance spring 12, said side-arms of the pivot-member encircling said spring as said pivot member reaches the lower limit of its movement.

I prefer to make the scale-beam or lever, 18, of a single piece of sheet metal formed to the desired shape, and it comprises the V-shaped portion, 25, having downwardly turned flanges, 26 and 27, along its lateral edges, said flanges being perforated for mounting said lever upon the pivot pins 28 and 29. The pivot-pin, 28, pivots said scale-lever on the lower end of said scale-frame, 19, and the pivot-pin, 29, joins same to the lower end of said load-post, 7. Said flange, 26, of said scale-lever is widened and extends forward and upward substantially L-shaped at its end portion and is provided on its free end, 30, with a laterally facing curved-rack or segmental gear, 31, said rack engaging a small pinion or spur-gear wheel, 32, fixed on the short shaft or pivot, 33, adjacent its rear end. Said shaft, 33, is mounted in a central bearing in said scale-plate, 5, and in a bearing in said front plate, 4, and carries the index-hand, 34, rigidly mounted on its outer end, adapted to sweep said plate and indicate the weight of the load on said scale-pan. The axis of said pinion lies in a plane parallel with the sweep of said rack and is preferably so positioned that its rearward extension intersects the axis of the pivot, 28, of the scale-lever, 18, but as will be explained hereinafter does not necessarily do so. To hold said shaft, 32, relatively endwise with as little friction as possible, a tongue 35 is struck up out of said plate, 4, and turned over to engage the rear pointed end of the shaft, 33, the weight of the shaft, pinion and hand, holding said shaft against said tongue 35.

The front plate, 4, is provided with a suitable opening or slot, 36, to permit the free play of the forward end of said scale-lever, 18, and its integral rack. The rack, 31, is held in proper operative relation to said pinion by the rounded projection, 37, of said plate, 4, which projects into said slot, 36, close to the back of said lever, 18, and permits of the free movement of said lever, but does not permit of the disengagement of the rack and pinion. It is desirable that the teeth of the rack and pinion have no free play between them as this would tend to inaccurate results. To take up any slack which might occur between the teeth of the rack and pinion due to the looseness of the pivots of the lever or otherwise, and keep the teeth in proper engagement with a light yielding pressure, a small, sufficiently stiff compression spring, 38, is mounted on said pivot-pin, 29, between the lower end of the adjacent side-bar, 7', of said U-shaped load-post, 7, and said flange, 26, of the scale-lever, 18. The forward, or rack end, 30, of said scale-lever, 18, which carries the toothed flange or rack 31, is made integral with the pivot-member, as illustrated in the drawings. In fact, I form up the entire scale-beam and rack from a single piece of sheet metal for the reason that I am enabled to considerably reduce the cost of making and handling small parts. Said curved rack, 31, is concentric with said rear pivot-pin, 28, of the scale-lever, 18, and as the finished form or position of the teeth on same is of importance in the cheap production of the scale and accurate weighing by it, I will briefly describe the method of producing the rack. In making said scale-lever, 18, and its integral rack, 31, a curved lateral flange is formed upon the end, 30, of said pivot-member so related to the body of the member that when said member reaches its finished condition said flange will be concentric with the holes in the side flanges of said member which receive said rear pivot-pin, 28. The curved flange having been produced, it remains to cut teeth on same by a process which is both reasonable in cost and sufficiently accurate in results, to reduce the variation in the accuracy of the scale at different points of rack-action to a point where it is of no material consequence. The teeth, 39, of said rack, are first cut parallel with each other, as indicated by the parallel pairs of lines, 40, in Fig. 5, the direction of the axis of the teeth being such that when the rack is in mesh with the pinion the center tooth of the rack will mesh accurately with same. As the teeth are parallel with each other, it is readily seen that the middle tooth would be the only one which could be brought into accurate alinement with the pinion, the distance of any tooth from the middle tooth being a measure of its lack of true alinement with the pinion tooth.

To complete the formation of the rack and bring the center line of each tooth accurately to its true operative relation to the teeth of the pinion, the rack is forced into a die having openings or matrices accurately formed to receive the teeth and set them to their true positions, as indicated by the converging pairs of parallel lines, 41, in Fig. 6, which meet on the center line of the engaging pinion-tooth; thus each tooth of the rack, as it engages the pinion, engages it in parallel relation and fits accurately.

Having thus described my invention, I claim as new and desire to secure by Letters Patent:

1. A weighing-scale having an inclined circular scale-plate, an index-hand adapted to sweep said plate and a spur gear adapted to move said hand in combination with a pivotally mounted scale-lever and a curved rack formed integrally therewith, the teeth of said rack having parallel side faces adapted to engage the teeth of said gear in parallel relation, to move said hand, substantially as described.

2. A weighing-scale having a scale-plate, an index hand adapted to sweep said plate and a pinion adapted to move said hand, in combination with a pivotally mounted scale-lever, a toothed-rack integral with said lever to engage said pinion to move said hand, and a spring acting on said lever to hold said pinion and said rack in operative engagement with each other with a yielding pressure, substantially as described.

3. A weighing-scale comprising a suitable frame in combination with a load-post, parallel link-members connecting said post and frame, counter-balancing means connected with said load-post, a curved rack formed up integrally from the free end of one of said link-members, an inclined scale-plate, an index-hand adapted to sweep said plate and a pinion adapted to be engaged by said rack to move said hand, and a spring acting against said link member for maintaining said rack in engagement with said pinion, substantially as described.

4. In a weighing-scale the combination with an inclined scale-plate, an index-hand adapted to sweep said plate and a spur-gear adapted to move said hand, of a frame, a load-post, parallel link-members connecting said frame and post, counter-balancing means connected to said load-post, a toothed curved rack integral with one of said link-members adapted to engage said gear to move said hand, and a compression spring between said load-post and said rack carrying link-member whereby said rack and said gear are yieldingly held in engagement with each other, substantially as described.

5. In a weighing-scale a suitable casing, a frame fixed within said casing, a load-post, parallel link-members connecting said post and frame, a balance-spring connected to said load-post, an inclined scale-plate, a hand adapted to sweep said plate, a gear adapted to move said hand, a curved laterally projecting toothed rack formed integrally with the lower link member adapted to engage said gear to move said hand, the teeth of said rack having parallel side-faces adapted to engage the teeth of said gear in parallel relation, and having their axes disposed on lines radial to the pivotal center of said link, substantially as described.

6. In a weighing scale a casing having a slotted wall, a dial plate disposed adjacent to and parallel with said wall, an index hand adapted to sweep said dial, a driving pinion therefor positioned between said wall and dial plate, a scale lever for transmitting motion from the load-post and passing through the slot in said wall to said pinion, and having a rack meshing with said pinion, said slot having a constricted portion for confining the rack in meshing engagement with the pinion.

7. A weighing scale, a casing having an inclined wall, a dial plate disposed parallel to said wall, an index hand adapted to sweep said dial, a driving pinion therefor disposed between and having journals in said wall and dial plate, a scale lever for transmitting motion from the load-post to said pinion and having a rack meshing with said pinion, said inclined wall having a slot wherein the lever operates, said slot being constricted in width at a point adjacent said pinion for preventing said rack from disengaging the pinion.

8. As an article of manufacture, a scale beam for weighing scales comprising a single piece of sheet metal laterally broadened at one end and formed for pivotal mounting and having an integral curved laterally projecting toothed rack, the teeth of said rack being disposed on the radii of the pivotal center of the beam, but having parallel side faces for engagement with the relative faces of the teeth of a spur gear.

9. As an article of manufacture a scale beam for indicating weighing scales, comprising a lever and a curved segmental crown gear at one end formed up from a single piece of sheet metal, the other end of said lever being broadly expanded in width and having two distinct pivotal bearings integrally formed therefrom at two widely separated points.

10. A scale beam for weighing scales formed up from a single piece of metal and comprising a broad arm having pivotal points at opposite sides, and an extension projecting therefrom substantially perpendicularly to the axial line of said pivoted points, a laterally turned rim on the end of said extension curved concentric to the pivotal center of said arm, and teeth formed on the edge of said rim having their faces arranged for substantially true engagement with the relative co-acting teeth faces of a spur gear, the axis of which lies at an angle to the pivotal axis of said arm.

In testimony whereof, I have hereunto set my hand, this 4 day of February, 1910, in the presence of two subscribing witnesses.

WILLIAM N. PELOUZE.

Witnesses:
E. F. WILSON,
M. SIMON.